United States Patent [19]
Creber et al.

[11] Patent Number: 4,820,461
[45] Date of Patent: Apr. 11, 1989

[54] PRODUCTION OF CERAMIC ARTICLES INCORPORATING POROUS FILLER MATERIAL

[75] Inventors: Dave K. Creber; Adam J. Gesing, both of Kingston, Canada

[73] Assignee: Lanxide Technology Company, LP, Newark, Del.

[21] Appl. No.: 212,112

[22] Filed: Jun. 24, 1988

Related U.S. Application Data

[63] Continuation of Ser. No. 907,939, Sep. 16, 1986, abandoned.

[51] Int. Cl.$^4$ .............................................. C04B 35/60
[52] U.S. Cl. ....................................... 264/57; 264/60; 264/82
[58] Field of Search ....................... 264/57, 59, 60, 65, 264/82; 501/98, 127, 128

[56] References Cited

U.S. PATENT DOCUMENTS

| | | | |
|---|---|---|---|
| 2,741,822 | 4/1956 | Udy | 264/59 |
| 3,255,027 | 6/1966 | Talsma | 106/65 |
| 3,296,002 | 1/1967 | Hare | 106/10 |
| 3,298,842 | 1/1967 | Seufert | 106/65 |
| 3,419,404 | 6/1964 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,538,231 | 11/1970 | Newkirk | 373/117 |
| 3,684,154 | 2/1975 | Gazza et al. | 29/123 B |
| 3,789,096 | 1/1974 | Church et al. | 264/60 |
| 3,973,977 | 8/1976 | Wilson | 106/62 |

FOREIGN PATENT DOCUMENTS 0116809 8/1984 European Pat. Off. .
0155831 9/1985 European Pat. Off. .
0169067 1/1986 European Pat. Off. .

OTHER PUBLICATIONS

"Oxidation of Molten Aluminum Alloys. Reaction with Refractories" by M. Drouzy and M. Richard–Mar. 1974–Fonderie, France No. 332, pp. 121–128.
"Refractories for Aluminum Alloy Melting Furnaces" by B. Clavaud and V. Jost, Sep. 1980–Trans. Lillian Brassinga Jan. 1985.

Primary Examiner—Ivars Cintins
Attorney, Agent, or Firm—Mark G. Mortenson

[57] ABSTRACT

Production of composite ceramic articles using a porous bed or preform of filler material with a molten metal in the presence of a vapor phase oxident, for effecting infiltrating growth of a polycrystalline matrix of a metal-oxidant reaction product into the filler bed or preform, wherein the filler material bed or preform has a first pore system of coarse interconnected pores, and a second pore system of finer interconnected pores defined by portions of the filler material which remain structurally stable in pore-defining arrangement during infiltration.

15 Claims, 3 Drawing Sheets

PRODUCTION OF CERAMIC ARTICLES INCORPORATING POROUS FILLER MATERIAL

This is a continuation of co-pending application Ser. No. 907,939, filed on Sept. 16, 1986, now abandoned.

BACKGROUND OF THE INVENTION

This invention relates to the production of ceramic articles comprising oxidation reaction products as hereinafter defined. More particularly, it relates to methods of making such articles by oxidation reaction of a parent metal with a vapor-phase oxidant, thereby to form a ceramic matrix incorporating the porous filler, and to products of such methods.

There is substantial current commerical interest in the use of ceramic materials for a wide variety of industrial, mechanical, electrical, and structural components, owing to the advantages attributes of these materials, such as their hardness, ability to withstand high temperatures, chemical inertness, beneficial properties for electrical applications, and relatively light weight. Ceramics provide attractive alternatives to metals for many existing purposes, as well as enabling the development of diverse new types of components for which metals or other materials are unsuitable.

The production of cermic components for technologically advanced applications is nevertheless attended with problems. Conventional ceramic-making methods have disadvantages including the high cost of sinterable powders, lack of batch-to-batch reproducibility of powder properties, substantial shrinkage on sintering, and susceptibility to retention of flaws produced by the forming procedure.

It is known to produce ceramics which are oxidation reaction products, viz. by reacting a precursor metal with an oxidant. As used herein, the term "oxidation reaction product" means one or more metals in any oxidized state wherein a metal (hereinafter "parent metal") has given up electrons to or shared electrons with another element, compound, or combination thereof (hereinafter "oxidant"). Accordingly, an "oxidation reaction product" under this definition includes the product of the reaction of one or more parent metals with an oxidant such as oxygen, nitrogen, halogen, sulphur, phosphorus, arsenic, carbon, boron, selenium, tellurium and compounds and combinations thereof, for example, methane, ethane, propane, acetylene, ethylene, propylene (as sources fro carbon), and mixtures such as air, $H_2/H_2O$ and $CO/CO_2$. Examples of suitable parent metals include, without limitation, aluminum, zirconium, titanium, silicon, zinc, hafnium, and tin.

European Patent Application No. 85301820.8, filed Mar. 15, 1985 and published Sept. 25, 1985, under publication number 0 155 831, and coassigned, describes a process for producing ceramic materials by oxidation reaction of a molten parent metal with a vapor phase oxidant, wherein the parent metal is heated to a temperature within a particular range (throughout which the parent metal is molten, but below the melting point of the oxidation reaction product) in the prsence of an atmosphere comprising or containing the vapor-phase oxidant. Formation of an oxidation reaction product occurs and proceeds with the progressive transport of molten parent metal through its own already-formed oxidation reaction product, and concomitant progressive formation of additional oxidation reaction product, thereby affording a ceramic body of advantageous thickness, with or without included unoxidated metal. In some instances, a dopant (e.g., one or more materials used in conjunction with the parent metal) may be used to enable the ceramic-forming reaction to go forward in the desired progressive manner.

It has also been known to produce ceramic composites by infiltrating a permeable bed or preform of oxidation reaction product, as adapted to the process of the above-cited European patent application. This filler material may have the same composition as the oxidation reaction product being formed or may differ in composition from the formed oxidation reaction product. A parent metal body is in extended surface contact with the permeable filler and the assembly is heated in the presence of a vapor-phase oxidant, with dopant present (where necessary or beneficial) either alloyed with the parent metal, or deposited on the surface of the parent metal body, or distributed through the filler body.

In these instances of producing ceramic composites, operating conditions are selected to achieve progressive infiltration and reaction, typically until infiltration of the permeable body with the oxidation reaction product is complete. If reaction proceeds to complete consumption of the parent metal, the produced article may be nearly all oxidation reaction product together with porosity and isolated nonoxidized metal plus any incorporated filler). If there is incomplete reaction of the parent metal, unreacted parent metal may be distributed through the produced article, and may comprise interconnected metal. The oxidation reaction product forms as a polycrystalline matrix incorporating the filler material, thereby providing a composite of the ceramic, optionally with unreacted metal and/or pores, and the filler material.

By such procedures, it is feasible to produce articles of near net shape. For instance, if a body of parent metal is surrounded by a permeable body of filler preform or particulate bed of substantially inert filler, and heated in the presence of oxidant until the metal has been completely oxidized, the resultant ceramic article will have an internal cavity conforming closely to the original external configuration of the initial parent metal body. If the permeable body itself has a defined external shape beyond which oxidation reaction product cannot occur, the produced ceramic article will have a corresponding external configuration.

With respect to these processes, it has been found that the filler may comprise particulate aggregates, wires, fibers, whiskers, woven lamina, and the like. Development work has proceeded with particulate aggregates owing to low cost and ease of making the preform. In the case of the particulate fillers, strength of the produced ceramic filler composite and many other mechanical properties are improved by reducing the particle size of the filler. However, it has been found in practice that green shapes (preforms) formed from very fine powders tend to contain forming flaws which are much larger than the maximum particle size and limit the strength of the material. Moreover, the gas permeability of the green shapes decreases with decrease of particle size, and hence the rate of the oxidation driven matrix penetration in the preform also decreases. In some cases, this oxygen starvation leads to formation of undesired constituents such as A1N which later hydrolyze and cause strength degradation.

SUMMARY OF THE INVENTION

The present invention, in a first aspect, contemplates the provision of improvements in a method of making a self-supporting ceramic body having a filler material incorporated in a ceramic matrix of an oxidation reaction product, by disposing a body of parent metal and a permeable body comprising the filler material in relation to each other for growth and infiltration of the oxidation reaction product into the permeable body. The metal body is molten, and maintained in contact with an atmosphere comprising a vapor-phase oxidant that reacts with the molten parent metal to form the oxidation reaction product, and while in the appropriate temperature region, molten metal is progressively transported through the oxidation reaction product where it oxidizes on contact with the oxidant forming additional reaction product of a polycrystalline ceramic matrix. The improvement according to the present invention, in such a method, broadly comprises using a permeable bed having (i) a first pore system comprised of interparticle pores, preferably relatively coarse, and (ii) a second pore system comprised of intraparticle pores, preferably that are fine in relation to the interparticle pores and distributed throughout the mass. The filler material having intraparticle porosity is structurally stable during infiltration of the bed. This dual system of coarse and fine pores is found to insure effective concomitant infiltration of the oxidation reaction product and gas permeation of the permeable bed.

As a further feature of the invention, in particular embodiments thereof, the filler material comprises porous agglomerates of stably cohered smaller particles or crystallites. The finer porosity is defined by and between the constituent cohered crystallites within each agglomerate, and is referred to as "intraparticle porosity," while the coarser porosity is constituted of the interstitial space between agglomerates within the bed, and is referred to as "interparticle porosity." Illustratively, the bed may be an aggregate (e.g., a packed bed) of these agglomerates, or a green shape or preform made up of agglomerates which are bonded together as, for example, by partial sintering.

Illustrative filler material agglomerates suitable for use in the present invention, and currently commercially available, are generally spheroidal in shape with a size sufficient to afford ease of handling. Their porosity is such as to enable infiltration of the oxidation reaction product and vapor-phase oxidant; hence they do not limit the reaction rate, or cause formation of undesirable phases by oxygen starvation at the reaction front. Moreover, green shapes (preforms) constituted of such agglomerates are unground and advantageously free of large flaws or inhomogeneities. At the same time, the constituent crystallites of the agglomerates may be of a very fine size; while they are held in the agglomerate structure against rearrangement during growth of the ceramic matrix in the present method, it is these fine crystallites that constitute the filler particles of the final product. Hence, use of the above-described agglomerates to constitute the permeable bed enables attainment of desired fineness of particle (i.e., crystallite) size yet without the difficulties and disadvantages that have heretofore been encountered with beds or preforms of very fine particles.

The constituent crystallites of the agglomerates may themselves by of any convenient shape, e.g. equiaxed or in the form of whiskers or platelets. In its broadest sense as used herein, the term "particles" embraces fibers, and the agglomerates may be fiber bundles or tows either filament-wound or woven into preform shape. The larger spaces between the bundles within the preform, in such a case, constitute the interparticle porosity while the fine voids between the individual fibers of each bundle constitute the intraparticle porosity.

In further embodiments of the invention, the permeable bed may be a sponge-type structure, for example a reticulated ceramic structure in which spaces between adjacent ceramic branches constitute the interparticle porosity with finely distributed connected porosity provided within the ceramic branches themselves to constitute the second pore system (corresponding to the intraparticle spacing in a body of the aggomerates).

Further features and advantages of the invention will be apparent from the detailed description hereinbelow set forth, together with the accompanying drawing.

DETAILED DESCRIPTION

Figure 1:
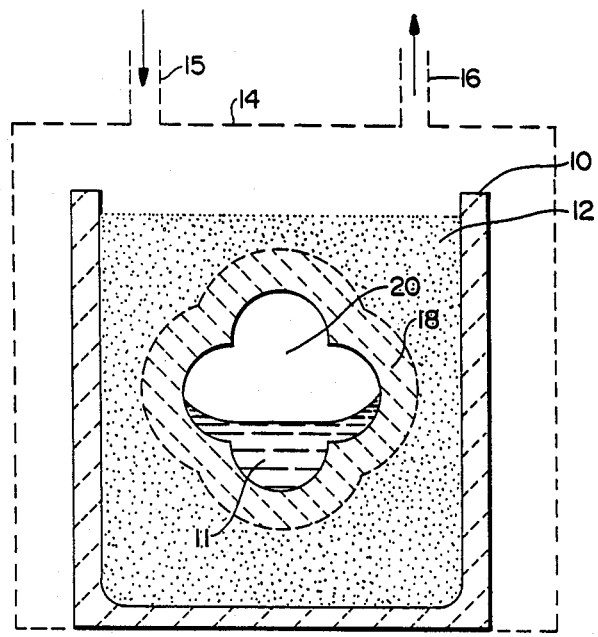
FIG. 1 is a simplified schematic elevational sectional view of a crucible, in a furnace, in illustration of the performance of an exemplary embodiment of the method of the invention.

The metod of the invention will be described as embodied in a method wherein a ceramic article comprising filler material incorporated in a ceramic matrix of an oxidation reaction product is formed by orienting a body of a parent metal and a permeable mass of filler material relative to each other for infiltration of the oxidation reaction product into the permeable mass; in the presence of a vapor-phase oxidant, melting the parent metal body and reacting the molten metal with the oxidant (by heating to an appropriate temperature) to form oxidation reaction product, and at such temperature maintaining at least a portion of the oxidation reaction product in contact with and between the body of molten metal and the oxidant, to progressively draw molten metal through the oxidation reaction product towards the oxidant and the filler material so that the oxidation reaction continues to form within the mass of filler material at the interface between the oxidant and previously formed oxidation reaction product and continuing the reaction for a time sufficient to infiltrate at least a portion of the mass of filler material, wherein (in accordance with the invention) the permeable mass comprises a first pore system constituted of interparticle porosity distributed throughout the mass and a second pore system constituted of intraparticle porosity also distributed throughout the mass, both systems of porosity being defined within or between portions of the filler material, and at least the portions of the filler material defining the second pore system being structurally stable, during infiltration of oxidation reaction product, in maintained pore-defining arrangement.

In a particular sense, the invention specifically contemplates the use, in this method, of a permeable body (filler material bed or preform) comprising one of the following:

(a) an aggregate or preformed body of particles of any composition that is substantially functionally inert to the parent metal under the conditions of the process of the present invention. Each particle itself comprises a porous agglomerate of stably cohered crystallites which may be equi-axed or in the form of whiskers or platelets. Some examples of such particles include the following:

(i) Calcined unground aluminum trihydrate, the particles of which retain the outer size and shape of the low density alumina trihydrate, but internally recrystallized to an intergrown network or alpha-alumina platelets. As the density of the trihydrate is approximately 2.4 g/cm$^3$ while that of alpha alumina is approximately 4 g/cm$^3$, these particles are typically 50% porous. The diameter of the alpha alumina platelets varies from 0.5 to 5 microns, depending on the calcination temperature schedule and mineralizer additions.

(ii) Spray dried or agglomerated and partially sintered particles of any chemical composition that is substantially functionally inert to the parent metal under the conditions of the process of the present invention. In this case, for equi-axed dense powder, the typical initial open porosity of the individual spraydried particles is approximately 40–50%. The porosity can be reduced to approximately 10–15% by a calcination procedure leading to partial sintering. Below 10–15% porosity, the pores are isolated and no longer accessible to the parent metal or its oxidation products.

(iii) Spray dried or agglomerated metal powder particles which are then reaction bonded either by nitridation or oxidation. Silicon and aluminum nitride powders are commercially produced by grinding of such nitrided metal particles. Porosities of such reaction bonded particles can vary widely, depending on the exact details of the oxidation process.

(iv) Particles formed by carbothermic reduction of spray dried or agglomerated particles of oxide precursors, etc. Boride, carbide and nitride powders and whiskers are commercially produced in this way. Carbides are produced under vacuum or inert atmosphere. Nitrides are formed by carbonitridation in ammonia, forming gas, or nitrogen. To make borides, $B_4C$ or $B_2O_3$ are used as boron precursors. In this case, large volume fractions of intra-particle porosity are achievable because of the release of $CO/CO_2$ gas reaction product. A wide variety of crystallite shapes ranging from equi-axed to high aspect ratio whiskers are obtainable. In the case of $TiB_2$, open spongelike particle structures are observed, which are particularly well suited for reactive infiltration.

(b) Preforms made of fiber bundles or tows, either filament wound or woven into preform shape. In this case, the larger spaces between the bundles provide "interparticle porosity," while the fine channels between the individual fibers in each bundle provide "intraparticle porosity." Again the fibers may be comprised of any substantially functionally inert material. Alternatively reactive fibers can be coated by a substantially functionally inert outer coating.

(c) Sponge-type structures, for example made by infiltration of a fugitive polymeric sponge by a ceramic slurry and partial sintering of that structure. The volume originally occupied by the polymer provides coarse interconnected channels ("interparticle porosity") and the partially sintered ceramic retains finely distributed connected porosity ("intraparticle porosity"). Any material functionally inert to the molten parent metal is suitable for production of sponge structures.

It will be appreciated that in each of the foregoing instances, the permeable body in accordance with the invention is characterized by a first pore system of interconnected relatively coarse pores, and a second pore system of interconnected finer pores, both distributed throughout the body. Where the permeable body is an aggregate or preformed body of porous agglomerates, the first pore system comprises the void spaces or interparticle porosity (between adjacent agglomerates in the bed or preform) and the second pore system comprises the intraparticle porosity, within each aggomerate, defined between the constituent crystallites of that agglomerate. Where the permeable body is constituted of bundles or tows of fibers, the first pore system comprises the void spaces between adjacent bundles and the second pore system comprises the void spaces between adjacent fibers in each bundle. Where the permeable body is a ceramic sponge, the first pore system is defined between the constituent ceramic branches of the sponge and the second pore system comprises the pores defined within each ceramic branch. Also, in each case, the portions of the filler material defining the second pore system are structurally stable so as not to undergo pore-closing rearrangement during the infiltration step of the method; thus, for example, in the case of a bed or preform of agglomerates of crystallites, the individual crystallites of each agglomerate are stably cohered together in pore-defining arrangement with each other.

The filler is substantially functionally inert but may contain a minor fraction of a compound reducible by the parent metal; for example, in the case of Al parent metal, the filler may contain $SiO_2$ or $Si_3N_4$. The reducible siliceous compound may be added as a powder to the functionally inert filler (e.g. $Al_2O_3$ or SiC) in the form of quartz sand or an alumino-silicate mineral such as kaolin clay.

The reducible compound may be distributed as a mineral constituent of the filler material, for example, the $Na_2O$ content of $Al_2O_3$ which is typically between 0.05 and 0.6%, or the $SiO_2$ content of alumino-silicate minerals such as clays or feldspars which vary from 40–60%. In the latter case, the $SiO_2$ content of the filler would be reduced to 50% or less (i.e., a minor amount) by mixing with an inert material. The reducible compound may also be formed as a coating on the functionally inert filler either by precipitation from solution by any of the well-known sol-gel routes or by partial oxidation of the filler material, e.g. air oxidation of SiC at 1,300° C. to form an $SiO_2$ coating on all the filler particles.

The presence of a reducible compound in the filler promotes uniform and rapid initiation of the infiltration reaction and a uniform reaction infiltration front. The reducible compound(s) may be distributed uniformly throughout the filler bed, or concentrated at the interface between the filler and the parent metal.

Further minor additions to the filler can be made to alter its wetting characteristics with respect to the molten parent metal under the reaction conditions. For example, additions of alkali metal compounds tend to promote the wetting of the filler by the parent metal. Na, Li and K compounds are particularly suitable.

Referring to FIG. 1, in the illustrative embodiment of the present method there represented, a body of a parent metal (which, for example, may comprise aluminum, silicon, zirconium, hafnium, tin or titanium) and a permeable body in accordance with the invention (as defined above) are positioned adjacent each other and oriented with respect to each other so that growth of the oxidation reaction product will be in a direction toward the filler material of the permeable body in order that the filler material, or a part thereof, will be infiltrated by the growing oxidation reaction product and embedded therein. This positioning and orientation of the parent metal and filler material with respect to each other may be accomplished within a graphite or like crucible 10 by simply embedding a body of parent metal 11 within a permeable body comprising a bed 12 of particulate filler material as illustrated in FIG. 1 of by positioning one or more bodies of parent metal within, on or adjacent a permeable body comprising bed or other assembly (e.g. a porous green shape or preform) of the filler material. The assembly is, in any case, arranged so that a direction of growth of the oxidation reaction product will be toward the filler material, and the oxidation reaction product will permeate or engulf at least a portion of the filler material such that void space between filler particles will be filled in by the grown oxidation reaction product matrix.

When one or more dopant materials (described below) are required or desirable to promote or facilitate growth of the oxidation reaction product, the dopant may be used on and/or in the parent metal and, alternatively or in addition, the dopant may be used on, or incorporated in, the bed or preform of filler material.

In the case of employing aluminum or its alloys as the parent metal and an oxygen-containing gas as the oxidant in the process of the present invention, the appropriate amounts of dopants can be alloyed into or applied to the parent metal, as described below in greater detail. The parent metal body is then placed in the crucible 10 or other refractory container with the metal surface exposed to the adjacent or surrounding mass of permeable filler material 12 in the container and in the presence of an oxidizing atmosphere (typically air at ambient atmospheric pressure). The resulting assembly is then heated within a furnace 14 to elevate the temperature thereof into the region typically between about 850° C. and about 1,450° C., or, more preferably, between about 900° C. and about 1,350° C., depending upon the filler material, dopant or the dopant concentrations, or the combination of any of these whereupon the parent metal transport begins to occur through the oxide skin normally protecting the aluminum parent metal.

The continued high temperature exposure of the parent metal to the vapor-phase oxidant allows the continued oxidation of parent metal to form a polycrystalline reaction product layer of increasing thickness. This growing oxidation reaction product progressively impregnates the permeable adjacent filler material with an interconnected oxidation reaction product matrix which also may contain nonoxidized parent metal constituents, thus forming a cohesive composite. The growing polycrystalline matrix impregnates or permeates the filler material at a substantially constant rate (that is, a substantially constant rate of thickness increase over time), provided sufficient air (or oxidizing atmosphere) interchange is allowed in the furnace to keep a relatively constant source of oxidant therein. Interchange of oxidizing atmosphere, in the case of air, can be conveniently provided by vents 15 and 16 in the furnace 14. Growth of the matrix continues until at least one of the following ocurs: (1) substantially all of the parent metal is consumed; (2) the oxidizing atmosphere is replaced by nonoxidizing atmosphere, is depleted of oxidant, or evacuated; or (3) the reaction temperature is altered to be substantially outside the reaction temperature envelope, e.g., below the melting point of the parent metal. Usually, the temperature is reduced by lowering the furnace temperature, and then the material is removed from the furnace.

In the illustrative embodiment of FIG. 1, the initial parent metal body is a solid body of quatrefoilshaped cross section, and is buried in a permeable body comprising a packed bed of porous filler agglomerates. FIG. 1 shows conditions obtaining part way through the infiltration step. The starting parent metal body has melted and oxidation reaction product has infiltrated a zone 18 of the permeable body 12, leaving the volume 20 initially occupied by the solid parent metal body only partially filled with residual molten parent metal 11. The zone 18 constitutes a product shape comprised of the oxidation-reaction-product-infiltrated filler material, surrounding and defining a cavity (volume 20) which approximately replicates the original shape of the starting parent metal body.

The product of this method is a rigid, integral solid article consituted of the initial inert filler material of the permeable body, together with polycrystalline oxidation reaction product formed interstitially therein during the heating step as well as any unreacted parent metal that may be present. Preferably, in at least many instances, the quantity of metal in the initial parent metal body is so selected, in relation to the interstitial or pore volume of the permeable body, that at the completion of the reaction the latter volume is completely filled with the reaction product (with or without unreacted parent metal); thus, the produced article is a dense, self-bonded, essentially pore-free body constituted of the inert filler material of the initial permeable body incorporated in a polycrystalline matrix of the oxidation reaction product formed during the heating step and any unreacted metal that may be present.

The excess metal, in the latter case, may be either isolated or interconnected. Macroscopically excess metal may also be present on some external surfaces of the ceramic body providing a well-bonded metal-ceramic interface. In this manner, ceramic-surfaced metallic components may be produced deriving strength from their metallic core, and hardness, erosion resistance and/or other properties from the ceramic surface layer.

The present method, utilizing a porous preform or bed of filler material, enables ceramic components of near net shape to be readily achieved. The external surface configuration of the produced article may be determined by appropriately defining the initial external surface configuration of the permeable body, for example (if the latter body is a packed bed of particles) by confining the packed bed within a suitable shape-defining barrier that limits the growth of reaction product. Assuming that the quantity of metal in the initial parent metal body is so proportioned to the interstitial volume of the permeable body that the latter becomes completely infiltrated with oxidation reaction product during the heating step, and that the heating step is continued until such complete infiltration has occurred, and further assuming that the permeable body surrounds or substantially surrounds the parent metal body, the produced article will have a void or cavity corresponding to the spatial volume originally occupied by the parent metal body and replicating the external surface configuration of the parent metal body. Assuming that the quantity of parent metal is sufficient to achieve complete filling of the interstitial volume of the permeable body with oxidation reaction product, the produced article will be a uniform, solid body (with or without pores) having the external shape of the initial permeable body.

Figure 2:
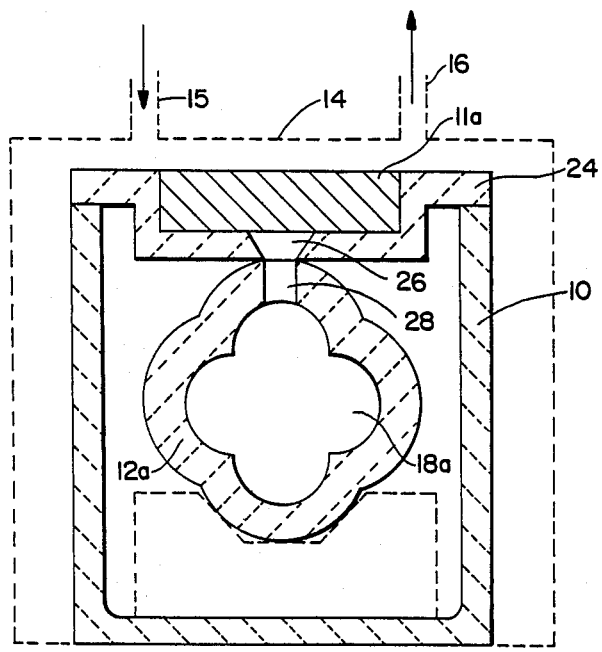
FIG. 2 is a view similar to FIG. 1 illustrating a setup for performance of another exemplary embodiment of the invention.

FIG. 2 illustrates an alternative embodiment of the present invention for producing an article similar to that produced by the embodiment of FIG. 1. In FIG. 2, within the refractory crucible 10 there is supported a permeable body 12a comprising a filler material preform in accordance with the invention, corresponding in configuration to the desired product article shape. The preform may, for example, be a body of porous agglomerates of filler material crystallites, the agglomerates being bonded together (e.g. by sintering) to form the selected shape, which in this case defines an internal, initially empty cavity 18a of quatrefoil cross section. A body of parent metal 11a is initially supported within a refractory well 24 above the crucible and communicating downwardly with the preform cavity 18a through an opening 26 in register with a port 28 in the preform. FIG. 2 shows the starting set-up for this procedure, with the crucible 10 disposed in the furnace 14 (already described with reference to FIG. 1) but before heating is commenced.

As heating proceeds, with continuing circulation of air or other vapor-phase-oxidant atmosphere through vents 15 and 16 so as to permeate the preform, the metal 11a melts and fills the preform cavity, with the result that oxidation reaction product infiltration the preform body. Dopant material, if needed or desired, may either be alloyed into the parent metal body or be coated on the internal surface of the preform or distributed throughout the preform. The final product, as before, is a rigid ceramic article incorporating the preform filler material in a matrix of oxidation reaction product with or without unreacted metal and/or pores.

Figure 3:
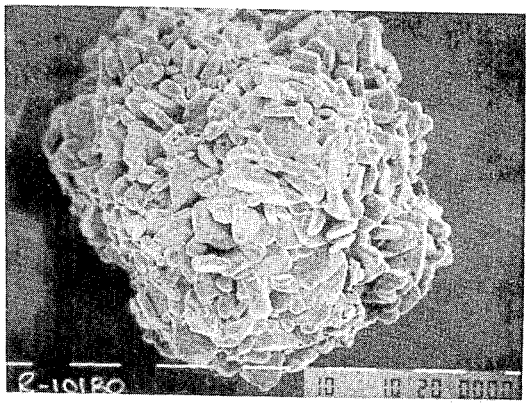
FIG. 3 is a scanning electron micrograph of an unground alpha alumina particle suitable for use as a filler particle to constitute a porous bed or preform for the practice of the method of the invention.
Figure 4:
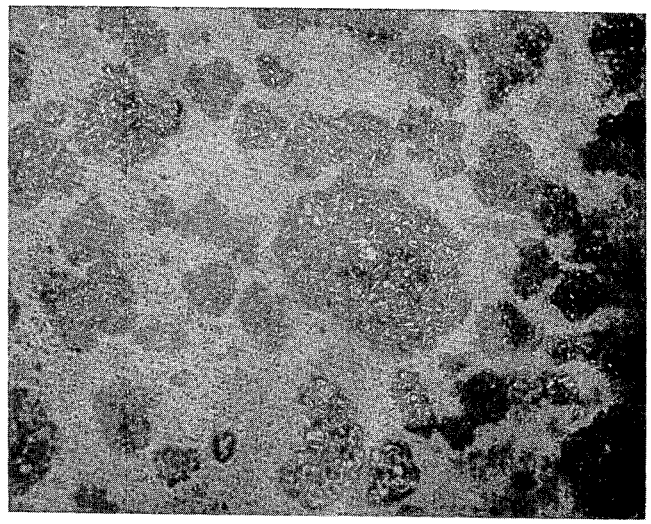
FIG. 4 is an optical micrograph of another unground alpha alumina particle suitable for use as a filler particle in the method of the invention.

To exemplify further the method of the invention, in specific (and, for particular purposes, especially preferred or convenient) embodiments, there is employed a permeable body (filler material bed or preform) comprising an aggregate of unground porous alpha alumina particles produced by calcination of metallurigical grade alumina trihydrate and each constituted of an agglomerate of alpha alumina crystallites. Such particles are commercially available, and are exemplified by the products sold under the trade name "Alcan C-70 Series" aluminas, viz. C-70, C-71, C-72, C-73 and C-75 alumina. FIG. 3 is a scanning electron micrograph of an unground porous particle of Alcan C-70 alumina, and FIG. 4 is an optical micrograph of an unground porous particle of Alcan C-72 alumina. Properties of the Alcan C-70 Series aluminas are given in the following table:

| PROPERTIES OF ALCAN C-70 SERIES UNGROUND CALCINED ALUMINAS | | | | | | |
|---|---|---|---|---|---|---|
| CHEMICAL PROPERTIES | | C-70 | C-71 | C-72 | C-73 | C-75 |
| $Na_2O$, % | typical | 0.40 | 0.18 | 0.13 | 0.12 | 0.05 |
| | max | 0.60 | 0.30 | 0.20 | 0.20 | 0.08 |
| Leachable $Na_2O$, % | typical | | | 0.03 | | 0.01 |
| | max | | | 0.06 | | 0.03 |
| $SiO_2$, % | typical | 0.03 | 0.03 | 0.03 | 0.04 | 0.02 |
| | max | 0.05 | 0.05 | 0.05 | 0.07 | 0.05 |
| $Fe_2O_3$, % | typical | 0.03 | 0.03 | 0.03 | 0.03 | 0.03 |
| | max | 0.05 | 0.05 | 0.05 | 0.06 | 0.05 |
| Specific Surface Area, $m^2/g$ | | 0.5–0.7 | 0.5–0.7 | 0.5–0.7 | 0.3–0.5 | 0.5–0. |
| Ultimate Crystal Size, $\mu m$ | | 2–3 | 2–3 | 2–3 | 3–5 | 1.5–3 |
| Bulk Density Loose, $g/cm^3$ (lb/cu ft) | | 0.8 (50) | 0.8 (50) | 0.8 (50) | 1.0 (63) | 0.7 (44) |
| Bulk Density Packed, $g/cm^3$ (lb/cu ft) | | 1.1 (69) | 1.1 (69) | 1.1 (69) | 1.3 (80) | 1.0 (63) |
| *Green Density, $g/cm^3$ | | 2.10 | 2.10 | 2.10 | 2.30 | 2.20 |
| *Fired Density @ 1620° C., $g/cm^3$ | | 3.65 | 3.70 | 3.71 | 3.60 | 3.80 |
| *Linear Shrinkage, % | | 14 | 14 | 14 | 12 | 16 |
| Cumulative Particle Size Distribution Wet Sieving with Tyler Screens | | | | | | |
| +100 mesh, % | | | | 10 | | |
| +200 mesh, % | | | | 60 | | |
| +325 mesh, % | | | | 97 | | |
| −325 mesh, % | | | | 3 | | |

*These properties of alumina are determined as follows:
125 g alumina is ground with 4000 g of 1 inch alumina grinding balls in a 1.3 gal mil rotating for 4 h at 62 rpm. Green density is determined on a 10 g disk pressed a 5000 psi in a 1 inch die without binder. Fired density and shrinkage are determined by Alcan Method 1074-71. Specific surface area is determined by the BET method.

The Alcan C-70 Series aluminas, all of which are suitable for the practice of the present process, are produced by calcining Bayer process alumina trihydrate (more correctly aluminum trihydroxide) in rotary kilns. The starting trihydrate is in particulate form. During calcination, the combined water is driven off and the oxide formed passes through several intermediate phases until the stable alpha-alumina structure is reached. Addition of small amounts of mineralizer during calcination accelerates the conversion to alpha alumina and promotes the growth of the alpha crystals. Particle size of the alumina is determined during the hydrate precipitation stage of the Bayer process, but crystallite size of alpha alumina is developed during the calcination process. Although the alumina trihydrate precursor is a nonporous particle of specific gravity 2.42 $g/cm^3$ and bulk density of about 1.3 $g/cm^3$, the resulting unground alpha alumina is a porous aggregation (open lattice structure) of monocrystal platelets (crystallites) with a specific gravity of 3.98 $g/cm^3$ and a bulk density of only about 1 $g/cm^3$. These aluminas are 95–100% alpha alumina and have less than 0.1% loss on ignition. Any nonleachable soda present is in the form of beta alumina, $Na_2O \cdot 11Al_2O_3$. the fine aluminas of the C-70 series differ from each other in crystal size and soda content, reduction in soda content being effected (in all but C-70 alumina) by appropriate treatment during calcination.

Although typical present-day commercial uses for such aluminas involve grinding the as-calcined porous particles, the use of the particles in unground condition contributes importantly to the attainment of the advantages of the present invention. Each of these unground particles is a stable, generally spheroidal, multicrystallite structure of, say, several tens of microns in size, cohered together, with an open network of substantially uniformly distributed pores, the pores being of similar size to the crystallites. Each unground particle is thus a porous agglomerate of crystallites, within the meaning of the term agglomerate as used herein. The unground porous particles are easily handled and readily assembled into packed beds or porous preforms free of large flaws or inhomogeneities. The stably cohered crystallite structure of the individual unground particles maintains the individual crystallites against rearrangements prior to and during matrix (oxidation reaction product) growth and preserves the open porosity of the assembled bed or preform for assured adequate permeation of vapor phase oxidant until matrix formation is complete.

In the practice of the present and like methods, the scale of the grown polycrystalline matrix microstructure is refined by reduction of filler particle size in the bed or preform. Hence, for a fine matrix microstructure, a very fine filler particle size is desirable. The minute individual crystallites of alpha alumina in the unground porous alumina particles exemplified by Alcan C-70 Series aluminas constitute such fine filler particles, for the purpose of determining fineness of grown matrix microstructure, notwithstanding that each unground particle of the filler bed or preform is a much larger agglomerate of multiple crystallites, held in an open structure. Thus, use of the described unground porous particles to constitute the bed or preform affords both the particle fineness required for fine matrix microstructure and the maintained permeability and homogeneity (freedom from gross flaws) usually associated with larger particles.

The size of the unground porous particles can be tailored by choice of size of the trihydrate precursor, and the alpha crystallite size by the calcination schedule and mineralizer additions, as will be apparent to persons skilled in the art. Also, while it is satisfactory in many cases to provide (in the present method) a filler bed or preform consisting essentially of an aggregate of the unground porous alpha alumina particles described above, the aggregate may also include a minor proportion of smaller porous or nonporous inert powder particles, e.g. a porportion of fines selected to fill the interstices (typically about 10 to 20 microns in size) between the larger unground particles. Similarly in the use of other permeable bodies embraced within the invention, such minor proportions of fines may be incorporated.

Figure 5:
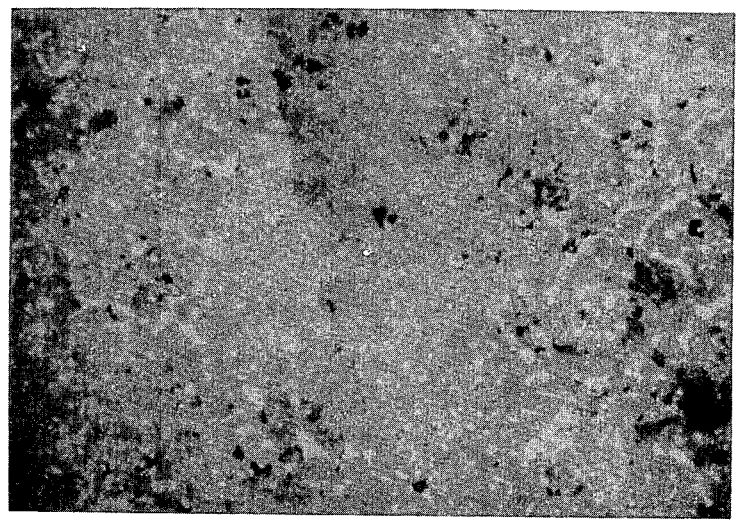
FIG. 5 is a micrograph of an unground alpha alumina particle after infiltration with metal in the practice of the invention.

Referring again to FIG. 1, then, in an illustrative instance of the practice of the present method, a body of aluminum metal 11, e.g. alloyed or coated with minor proportions of suitable dopants such as Mg and Si or coated with a thin powder layer of suitable dopant such as MgO and/or silica, is embedded in a packed bed 12 of Alcan C-70 unground porous alpha alumina particles, and heated in air (oxidant) to a temperature at which the metal is molten and at which progressive ceramic (al-phaAl$_2$O$_3$) growth into the packed bed occurs. FIG. 5 is a micrograph of unground Alcan C-72 alpha alumina after such infiltrating ceramic growth. Heating is continued until the oxidation reaction product fully permeates the packed bed. The resultant article is a rigid, selfsustaining article comprising alpha alumina crystallites of the filler particles distributed through the intergrown polycrystalline alpha alumina matrix, with or without unreacted metal present.

In an actual test, preforms were produced by slip casting ground Alcan C-70 Series aluminas. When it was attempted to grow a matrix of Al$_2$O$_3$ into these preforms using molten aluminum in the presence of air as oxidant, it was found that growth was very slow. In contrast to these results, such matrix growth into a bed or unground Alcan C-70 Series alumina particles was substantial, under generally comparable process conditions. Significantly, in the bed of unground particles, the Al$_2$O$_3$ matrix growth and any metallic constituents present completely filled the interior of the porous particles, affording a dense, fine microstructure suitable for structural component applications.

In specific embodiments, the method of the invention involves a particular utilization or modification of more general techniques for producing a self-supporting ceramic body by oxidation of a parent metal to form an oxidation reaction product, as heretofore disclosed in the aforementioned European Patent Application and-/or in one or more of the U.S. patent applications Ser. No. 818,943, filed Jan. 15, 1986, which is a continuation-in-part of Ser. No. 776,964 filed Sept. 17, 1985; which is a continuation-in-part of Ser. No. 705,787, filed Feb. 26, 1985, which is a continuation-in-part of Ser. No. 591,392, filed Mar. 16, 1984, all in the name of Marc S. Newkirk et al. and all assigned to the same assignee as the present application. More specifically, in these techniques the parent metal is heated to an elevated temperature above its melting point but below the melting point of the oxidation reaction product in order to form a body of molten parent metal which reacts upon contact with a vapor-phase oxidant to form the oxidation reaction product. The oxidation reaction product, or at least a portion thereof which is in contact with and extends between the body of molten parent metal and the oxidant, is maintained at the elevated temperature, and molten metal is drawn through the polycrystalline oxidation reaction product and towards the oxidant, and the transported molten metal forms oxidation reaction product upon contact with the oxidant. As the process continues, additional metal is transported through the polycrystalline oxidation reaction product formation thereby continually "growing" a ceramic structure of interconnected crystallites. Usually, the resulting ceramic body will contain therein inclusions of nonoxidized constituents of the parent metal drawn through the polycrystalline material and solidified therein as the ceramic body cooled after termination of the growth process. As explained in one or more of the aforementioned patent applications, resultant novel ceramic materials are produced by the oxidation reaction between a parent metal and a vaporphase oxidant, i.e., a vaporized or normally gaseous material, which provides an oxidizing atmosphere. In the case of an oxide as the oxidation reaction product, oxygen or gas mixtures containing oxygen (including air) are suitable oxidants, with air usually being preferred for obvious reasons of economy. However, oxidation is used in its broad sense, as herein, and refers to the loss of, or sharing of electrons by a metal to an oxidant which may be one or more elements and/or compounds. Accordingly, elements other than oxygen may serve as the oxidant. In certain cases, the parent metal may require the presence of one or more dopants in order to favorably influence or facilitate growth of the ceramic body, and the dopants may be provided as alloying constituents of the parent metal. For example, in the case of aluminum as the parent metal and air as the oxidant, dopants such as magnesium and silicon, to name but two of a larger class of dopant materials, were alloyed with the aluminum alloy utilized as the parent metal. Alternatively, and as previously disclosed in one or more of U.S. patent applications Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985; and Ser. No. 632,636, filed July 20, 1984, all in the name of Marc S. Newkirk et al., and all assigned to the same assignee as the present application, appropriate growth conditions as described above, for parent metals requiring dopants, can be induced by externally applying a lyer of one or more dopant materials to the surface or surfaces of the parent metal, thus avoiding the necessity of alloying the parent metal with dopant materials, e.g., metal oxides such as those of magnesium, zinc and silicon, in the case where aluminum is the parent metal and air is the oxidant.

Thus, the foregoing techniques enable the production of oxidation reaction products readily "grown" to desired thicknesses heretofore believed to be difficult, if not impossible, to achieve with conventional ceramic processing techniques. The underlying metal, when raised to a certain temperature region above its melting point, and in the presence of dopants (if required) is transported through its own otherwise impervious oxidation reaction product, thus exposing fresh metal to the oxidizing environment to thereby yield further oxidation reaction product. The result of this phenomenon is the progressive growth of a dense, interconnected ceramic optionally containing some nonoxidized parent metal constituents distributed throughout the growth structure.

The specific type of procedure with which the present invention is concerned, as described in U.S. patent application Ser. No. 819,397, filed Jan. 17, 1986, which is a continuation-in-part of Ser. No. 597,876, filed Feb. 4, 1985, both in the name of Marc S. Newkirk et al. and assigned to the same assignee as the present application is a method for producing a self-supporting ceramic composite structure comprising (1) a ceramic matrix obtained by oxidation of a parent metal, e.g. an aluminum alloy, to form a polycrystalline material consisting essentially of (i) the oxidation reaction product (e.g., alphaaluminum oxide) of the parent metal with a vapor-phase oxidant (e.g., oxygen) and, optionally, (ii) one or more nonoxidized constituents of the parent metal; and (2) a filler embedded by the matrix.

Generally, this procedure is based upon the discovery that the growth of a polycrystalline material resulting from the oxidation of a parent metal by the above-described techniques can be directed towards a permeable mass of functionally inert filler material, sometimes herein referred to simply as "filler," which is placed adjacent the parent metal. The filler is engulfed and embedded within the growth of polycrystalline material to provide a composite ceramic structure. Under suitable process conditions, the molten parent metal oxidizes outwardly from its initial surface (i.e., the surface exposed to the oxidant) towards the oxidant and the filler by migrating through its own otherwise impermeable oxidation reaction product structure. The oxidation reaction product grows into the permeable mass of filler, which may comprise an aggregate of divided solid filler material. This results in novel ceramic matrix composite structures comprising a dense matrix of a ceramic polycrystalline material embedding the filler materials.

The mass or aggregate of filler material or materials is positioned adjacent the parent metal in the assumed path of the oxidation reaction product growth therefrom. The filler material can comprise either a loose or bonded array or arrangement of materials, which array has interstices, openings, intervening spaces, or the like, to render it permeable to the oxidant and to the oxidation reaction product growth. Further, the filler material may be homogeneous or heterogeneous, and may have a chemical composition identical to or different from the grown oxidation reaction product matrix. A matrix of the polycrystalline material resulting from the oxidation reaction product growth is simply grown around the filler material so as to embed the latter without substantially disturbing or displacing it. Thus, no external forces are involved which might damage or disturb arrangement of the filler material and no awkward and costly high temperature, high pressure processes and facilities are required as in known conventional processes to achieve a dense composite ceramic structure. In addition, the stringent requirements of chemical and physical compatibility necessary for pressureless sintering to form ceramic composites are greatly reduced or eliminated.

In the ceramic matrix growth process, the parent metal is heated to a temperature above its melting point but below the melting point of the oxidation reaction product thereby forming a body of molten parent metal which is reacted with the oxidant to form the oxidation reaction product. At this temperature or within this temperature range, the body of molten metal is in contact with at least a portion of the oxidation reaction product which extends between the body of molten metal and the oxidant. Molten metal is drawn through the oxidation reaction product towards the oxidant and towards the adjacent filler material to sustain the continued formation of oxidation reaction product at the interface between the oxidant and previously formed oxidation reaction product. The reaction is continued for a time sufficient to embed at least a portion of the filler material within the oxidation reaction product by growth of the latter, which optionally has therein inclusions of non-oxidized constituents of parent metal, to form the composite structure.

The products of such procedures generally are adaptable or fabricated, such as by machining, polishing, grinding, etc., for use as articles of commerce which, as used herein, are intended to include, without limitation, industrial, structural and technical ceramic bodies for applications where electrical, wear, thermal, structural or other features or properties are important or beneficial; and it is not intended to include recycled or waste materials such as might be produced as unwanted by-products in the processing of molten metal.

As used herein, reference to an "oxidant," "vapor-phase oxidant," or the like, which identifies the oxidant as containing or comprising a particular gas or vapor, means an oxidant in which the identified gas or vapor is the sole, or predominant, or at least a significant oxidizer of the parent metal under the conditions obtaining in the oxidizing environment utilized. For example, although the major constituent of air is nitrogen, the oxygen content of air is the sole or predominant oxidizer for the parent metal because oxygen is a significantly stronger oxidant than nitrogen. Air is therefore an "oxygen-containing gas" oxidant but not a "nitrogen-containing gas" oxidant within this definition.

The term "parent metal" as used herein refers to that metal, e.g., aluminum, which is the precursor of the polycrystalline oxidation reaction product and includes that metal or a relatively pure metal, a commercially available metal having impurities and/or alloying constituents therein, and an alloy in which that metal precursor is the major constituent. Although the invention is described herein with particular emphasis on aluminum as the parent metal, other metals which meet the criteria of the invention are also suitable, such as silicon, titanium, tin, zinc and zirconium.

The term "ceramic" as used herein is not limited to a ceramic body in the classical sense, that is, in the sense that it consists entirely of non-metallic and inorganic materials but, rather, it refers to a body which is predominantly ceramic with respect to either composition or dominant properties, although the body may contain substantial amounts of one or more metals derived from the parent metal, most typically within a range of from about 1-40% by volume, but may include still more metal.

As further set forth in one or more of the above-cited applications, certain parent metals under specific conditions of temperature and oxidizing atmosphere meet the criteria necessary for the oxidation phenomenon of the present invention with no special additions or modifications. However, dopant materials used in combination with the parent metal can favorably influence or promote the oxidation reaction process.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentration for each of between about 0.1-10% by weight based on the total weight of the resulting doped metal. The concentration range for any one dopant will depend on such factors as the combination of dopants and the process temperature. Concentrations within this range appear to initiate the ceramic growth, enhance metal transport and favorably influence the growth morphology of the resulting oxidation reaction product.

Other dopants which are effective in promoting polycrystalline oxidation reaction product growth for aluminum-based parent metal systems using air or oxygen as oxidant are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1,000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above, For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions. The dopant or dopants (1) may be provided as alloying constituents of the parent metal, (2) may be applied to at least a portion of the surface of the parent metal, or (3) may be applied to the filler or a part of the filler bed, or any combination of two or more techniques (1), (2) and (3) may be employed.

By way of further illustration of the invention, reference may be made to the following examples:

EXAMPLE I

Al alloy (10% Si-up to 3% Mg) was disposed for growth of oxidation reaction product into an Alcan C=72 unground alumina bedding (crystalline size 1.5 microns to 5 microns diameter, agglomerated into a particle of size 45 microns to 150 microns diameter) in an atmosphere of air (up to 100% oxygen has been used). Reaction time and temperatures varied as follows:

Time (hours to soak temperature): 2
Time (hours at soak temperature): 0 to 100
Temperature (C): 1,100° to 1,250°
Alloy: Al+10% Si+(0.0 to 3.0%) Mg The experimental set-up was either as a cube of metal sitting in the bedding with the top surface of the metal exposed to the reactive gas or as a cube of metal completely buried in the bedding (all metal surfaces in contact with the bedding).

FIG. 5 shows an optical micrograph of a cross section of the resulting growth. The experimental conditions used to obtain this sample were: 100 hours at 1,150° C., alloy Al-10% Si with MgO applied as a slurry to the surface of the metal to serve as an external dopant. The figure shows an alimina particle infiltrated with aluminum alloy. The particle is surrounded by Al metal/aluminum oxide growth product.

EXAMPLE II

The experimental setup employs two concentric thick walled crucibles formed from the same mix and by the same process. The outer crucible has a 3.8 cm outer diameter and a 2.5 cm inner diameter. An aluminum alloy slug of nominal composition Al-3% Mg-10% Si is placed into the larger crucible and the 2.5 cm outer diameter inner crucible is then inserted. The inner crucible acts as a floating lid thereby preventing growth from the slug into free air. Thus the oxidation reaction product growth is directed into the ceramic preform.

Crucibles with various densities were fabricated by mixing various proportions of ground and unground Alcan C-72 aluminas. Ground C-72 alumina consists of individual crystallites liberated from the unground agglomerate particles. It is in the form of platelets up to 5 microns in diameter and about 1 micron thick. These powder mixtures where then mixed with a 5 weight % polyvinyl alcohol solution using only enough binder solution to allow the mix to flow when vibrated in the rubber molds. Generally speaking, as the proportion of unground alumina increased, so did the amount of binder solution necessary to permit flow. The vibration of the mold was stopped when air bubble evolution was no longer observed. The molds were then placed in a freezer overnight to permit removal of the casting from the mold. Immediately thereafter, the cast crucibles were placed in a drying oven at 90° C. to drive off the excess water and set the organic binder. Finally, the crucibles were given a bisque firing at 1,300° C. for two hours to drive off the organic binder and impart sufficient high temperature strength to allow the subsequent exposure to molten aluminum at 1,250° C.

The metal slugs and lightly sintered crucibles were assembled and heated to 1,250° C. for 24 hours in air.

Where MgO was used as a dopant, it was applied after the bisque firing by filling the containment crucible to the height of the metal slug with a waterbased MgO slurry and immediately removing the excess. Where Si dopant was used as an accelerator, it was added in the form of 100 mesh powder to the C-72 alumina mixture.

Results, expressed as average percent weight gain on aluminum versus average preform density, are set forth in the following table:

| Ground/ Unground Ratio | Silicon In Preform (%) | MgO | Average Porosity (%) | Average Density (g/cc) | Average Wt. Gain on Al (%) | Range of Wt. Gain on Al (%) |
| --- | --- | --- | --- | --- | --- | --- |
| 3:7 | 0.0 | No | 64.9 | 1.4 | 10.6 | 10.0–11.0 |
| 5:5 | 0.0 | No | 64.9 | 1.4 | 7.3 | 4.3–10.9 |
| 7:3 | 0.0 | No | 54.9 | 1.8 | 10.1 | 4.4–24.6 |
| 10:0 | 0.0 | No | 47.4 | 2.1 | 17.0 | 15.2–17.9 |
| 3:7 | 4.8 | No | 72.4 | 1.1 | 72.0 | 40–90* |
| 5:5 | 4.8 | No | 62.4 | 1.5 | 8.8 | 8.3–9.8 |
| 7:3 | 4.8 | No | 54.9 | 1.8 | 32.5 | 28.7–35.1 |
| 10:0 | 4.8 | No | 49.8 | 2.0 | 18.6 | 14.2–23.3 |
| 3:7 | 0.0 | Yes | 69.0 | 1.2 | 85.5 | 85.0–86.1 |
| 5:5 | 0.0 | Yes | 61.2 | 1.5 | 65.6 | 54.7–81.0 |
| 7:3 | 0.0 | Yes | 50.9 | 1.9 | 40.5 | 20.3–57.0 |
| 10:0 | 0.0 | Yes | 45.7 | 2.1 | 14.6 | 11.1–23.3 |
| 3:7 | 4.8 | Yes | 69.0 | 1.2 | 82.1 | 79.3–86.8 |
| 5:5 | 4.8 | Yes | 61.2 | 1.5 | 49.2 | 37.2–60.3 |
| 7:3 | 4.8 | Yes | 50.9 | 1.9 | 35.4 | 28.9–42.4 |
| 10:0 | 4.8 | Yes | 48.3 | 2.0 | 39.8 | 37.3–43.3 |

SUMMARY OF PREFORM INFILTRATION RESULTS FOR CONCENTRIC CRUCIBLE EXPERIMENTS

*Contains some estimated values.

The results indicate that in all cases, higher weight gains corresponding to the formation of the oxidation reaction product were obtained with more porous, less dense filler mixtures produced with higher proportions of the unground alumina.

EXAMPLE III

Slugs of Al-10% Si alloy were completely buried in beds of unground Alcan C-72 alumina particles, heated from 20° C. to 1,150° C. over two hours, held at 1,150° C. for 100 hours, and cooled to ambient temperature over about 14 hours. In one test, no dopant was employed, and no visible growth was observed. In a second test, the metal slug was coated with MgO in water. Extensive, non-uniform growth was observed.

EXAMPLE IV

Slugs of Al-10% Si-3% Mg alloy were completely buried in beds of unground Alcan C-72 alumina particles, and the samples (slug plus bed) were subjected to heating at 1,150° C. for 24 hours. Initial and final weights of the samples, and dopants employed, were as follows:

| Sample No. | Starting Weight (grams) | Dopant Used | Final Weight (grams) |
| --- | --- | --- | --- |
| 1 | 2.570 | none | 2.679 |
| 2 | 3.111 | painted with aqueous solution of $Na_2Si_2O_5$ | 6.960 |
| 3 | 2.970 | painted with aqueous solution of $Na_2Si_2O_5$ & MgO | 6.578 |
| 4 | 2.794 | painted with aqueous solution of water & MgO | 6.394 |

It is to be understood that the invention is not limited to the features and embodiments hereinabove specifically set forth, but may be carried out in other ways without departure from its spirit.

We claim:

1. A method of making a ceramic article comprising a substantially functionally inert filler material incorporated in a cermaic matrix of an oxidation reaction product, including the steps of
   (a) orienting a body of a parent metal and a permeable mass of filler material relative to each other for infiltration of the oxidation reaction product into the permeable mass;
   (b) in the presence of a vapor phase oxidant, melting the parent metal body and reacting the molten metal with the oxidant to form oxidation reaction product, by heating to a predetermined temperature and at said temperature maintaining at least a portion of said oxidation reaction product in contact with and between said body of molten metal and said oxidant, to progressively draw molten metal through the oxidation reaction product towards the oxidant and the filler material so that the oxidation reaction product continues to from within said mass of filler material at the interface between the oxidant and previously formed oxidation reaction product and continuing said reaction for a time sufficient to infiltrate at least a portion of said mass of filler material, wherein the improvement comprises (c) the permeable mass comprising a first pore system constituted of interparticle porosity distributed throughout the mass and a second pore system constituted of intraparticle porosity also distributed throughout the mass, both systems of porosity being defined within or between portions of the filler material, and at least the portions of the filler material defining the second pore system being structurally stable, during infiltration of oxidation reaction product, in maintained pore-defining arrangement.

2. A method according to claim 1, wherein the permeable mass comprises an aggregate of filler material in the form of unground particles which are themselves porous agglomerates of stably cohered crystallites, the second pore system being defined by and between the constitutes cohered cyrstallites within each agglomerate and the first pore system being constituted of voids defined between adjacent agglomerates within the permeable mass.

3. A method according to claim 2, wherein said aggregate comprises a major proportion by weight of said agglomerates and a minor proportion by weight of particles, smaller than said unground particles, of functionally inert material.

4. A method according to claim 3, wherein said agglomerates in said permeable mass have interstices between them, and wherein the proportion of said smaller particles is such that said smaller particles substantially fill said interstices.

5. A method according to claim 2, wherein said aggregate is a preform of self-sustaining shape constituted by bonding said agglomerate together.

6. A method according to claim 2, wherein said agglomerates are unground porous particles of alpha alumina produced by calcination of alumina trihydrate and each constituted of a multiplicity of alpha alumina crystallites.

7. A method according to claim 6, wherein said metal is aluminium.

8. A method according to claim 7, wherein said oxidant is atmospheric oxygen and said reaction product is alpha alumina.

9. A method according to claim 2, wherein said agglomerates are spray dried or agglomerated and partially sintered particles of material which are substantially functionally inert under the process conditions of said method.

10. A method according to claim 2, wherein said agglomerates are spray dried or agglomerated metal powder particles which are reaction beonded by nitridation or oxidation.

11. A method according to claim 2, wherein said agglomerates are formed by carbothermic reduction of spray dried or agglomerated particles of oxide precursors.

12. A method according to claim 1, wherein said permeable mass is a preform constituted of bundles or tows of fibers, said first pore system being constituted of voids between adjacent bundles or tows and said second pore system being constituted of spaces between adjacent fibers in each bundle or tow.

13. A method according to claim 12, wherein said fibers are not substantially inert under the conditions of said method but are coated so as to be substantially inert under the process conditions of said method.

14. A method according to claim 1, wherein the permeable mass is a sponge-type structure of ceramic branches, in which spaces between adjacent ceramic branches constitute the first pore system with finely distributed connected porosity provided within the ceramic branches to constitute the second pore system.

15. A method of making a ceramic article comprising a substantially functionally inert filler material incorporated in a ceramic matrix of an oxidation reaction product, including the steps of (a) orienting a body of a parent metal and a permeable mass of filler material relative to each other for infiltration of the oxidation reaction product into the premeable mass;

(b) in the presence of a vapor phase oxidant, melting the parent metal body and reacting the molten metal with the oxidant to form oxidation reaction product, by heating to a predetermined temperature and at said temperature maintaining at least a portion of said oxidation reaction product in contact with and between said body of molten metal and said oxidant, to progressively draw molten metal through the oxidation reaction product towards the oxidant and the filler material so that the oxidation reaction product continues to form within said mass of filler material at the interface between the oxidant and previously formed oxidation reaction product and continuing said reaction for a time sufficient to infiltrate at least a portion of said mass of filler material, wherein the improvement comprises (c) the permeable mass comprising a first pore system constituted of interparticle porosity distributed throughout the mass and a second pore system constituted of intraparticle porosity also distributed throughout the mass, both systems of porosity being defined within or between portions of the filler material, and at least the portions of the filler material defining the second pore system begin structurally stable, during infiltration of oxidation reaction product, in maintaianed pore-defining arrangement, said permeable mass comprising a material selected from the group consisting of (1) an aggregate of filler material in the form of particles which are themselves porous agglomerates of stably cohered crystallites, the second pore system being defined by and between the constituent cohered crystallites within each agglomerate and the firs tpore system being constituted of voids defined between adjacent agglomerates within the permeable mass, (2) a preform constituted of bundles or tows of fibers, said first pore system being constituted of voids between adjacent bundles or tows and said second pore system being constituted of spaces between adjacent fibers in each bundle or tow, and (3) a sponge-type structure of ceramic branches, in which spaces between adjacent ceramic branches constitute the first pore system with finely distriburted connected porosity provided within the ceramic branches to constitute the second pore system.

* * * * *